(12) United States Patent
Krebs et al.

(10) Patent No.: US 10,805,465 B1
(45) Date of Patent: Oct. 13, 2020

(54) PREDICTIVE CUSTOMER SERVICE SUPPORT SYSTEM AND METHOD

(71) Applicant: United Services Automobile Association (USAA), San Antonio, TX (US)

(72) Inventors: Emily Kathleen Krebs, San Antonio, TX (US); Victor Kwak, Frisco, TX (US); Rachel Ann Krebs, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/228,342

(22) Filed: Dec. 20, 2018

(51) Int. Cl.
| | |
|---|---|
| *H04M 3/51* | (2006.01) |
| *G10L 15/22* | (2006.01) |
| *G10L 15/18* | (2013.01) |
| *G06N 20/00* | (2019.01) |
| *G06N 7/00* | (2006.01) |
| *G06F 40/30* | (2020.01) |
| *G06F 40/295* | (2020.01) |

(52) U.S. Cl.
CPC ........ *H04M 3/5183* (2013.01); *G06F 40/295* (2020.01); *G06F 40/30* (2020.01); *G06N 7/005* (2013.01); *G06N 20/00* (2019.01); *G10L 15/1815* (2013.01); *G10L 15/22* (2013.01); *H04M 2201/40* (2013.01)

(58) Field of Classification Search
CPC .. H04M 3/5183; H04M 2201/40; G06F 40/30
USPC .................................................. 379/265.09
See application file for complete search history.

(56) References Cited

U.S. PATENT DOCUMENTS

| | | |
|---|---|---|
| 6,600,821 B1 | 7/2003 | Chan et al. |
| 8,130,937 B1 | 3/2012 | Thenthiruperai et al. |
| 9,160,854 B1 | 10/2015 | Daddi et al. |
| 9,336,776 B2 | 5/2016 | Dahlmeier |
| 9,894,207 B2 * | 2/2018 | Sri .................... G06Q 30/0601 |
| 2004/0042612 A1 | 3/2004 | Michelson et al. |
| 2005/0100159 A1 | 5/2005 | Fink |

(Continued)

OTHER PUBLICATIONS

Castellanos, Sara, "Allstate's 'Digital Colleague' Amelia Answers Questions for Call Center Reps," CIO Journal, Mar. 30, 2018, Dow Jones & Company, Inc., https://blogs.wsj.com/cio/2018/03/30/allstates-digital-colleague-amelia-answers-questions-for-call-center-reps/.

(Continued)

*Primary Examiner* — Ahmad F. Matar
*Assistant Examiner* — Jirapon Intavong
(74) *Attorney, Agent, or Firm* — Fletcher Yoder, P.C.

(57) ABSTRACT

A system includes one or more processors configured to receive call-specific data during a call between a customer and a customer service representative, and the call-specific data includes a verbal input. The one or more processors are configured to determine one or more characteristics of the verbal input and to determine an initial inquiry of the customer based at least in part on the one or more characteristics of the verbal input. The one or more processors are also configured to determine one or more follow-up inquiries based at least in part on the initial inquiry and to provide information related to the one or more follow-up questions in a window on a display of a computing system for visualization by the customer service representative.

8 Claims, 13 Drawing Sheets

(56) References Cited

U.S. PATENT DOCUMENTS

| | | |
|---|---|---|
| 2005/0149418 A1 | 7/2005 | Erbey et al. |
| 2009/0013255 A1 | 1/2009 | Yuschik et al. |
| 2009/0228264 A1 | 9/2009 | Williams et al. |
| 2010/0080377 A1 | 4/2010 | Gould |
| 2010/0128867 A1 | 5/2010 | Vendrow |
| 2010/0274618 A1* | 10/2010 | Byrd ................... G06Q 10/10 704/275 |
| 2011/0010173 A1 | 1/2011 | Scott et al. |
| 2011/0307258 A1 | 12/2011 | Liberman |
| 2012/0089394 A1 | 4/2012 | Teodosiu et al. |
| 2014/0220526 A1 | 8/2014 | Sylves |
| 2015/0310877 A1 | 10/2015 | Onishi |
| 2016/0191709 A1 | 6/2016 | Pullamplavil et al. |
| 2017/0084295 A1 | 3/2017 | Tsiartas et al. |
| 2017/0206890 A1 | 7/2017 | Tapuhi et al. |
| 2017/0316438 A1 | 11/2017 | Konig et al. |
| 2018/0110460 A1 | 4/2018 | Danson et al. |
| 2018/0165062 A1 | 6/2018 | Yoo |
| 2019/0121853 A1* | 4/2019 | Cai ................... G06F 17/279 |

OTHER PUBLICATIONS

U.S. Appl. No. 16/029,142, filed Jul. 6, 2018, Krebs et al.

\* cited by examiner

*— 54*

YOU CAN WAIVE THE FEE THIS TIME.

FROM WHAT I UNDERSTAND, IT SOUNDS LIKE EVAN IS IN BETWEEN JOBS. HE'S BEEN WITH US FOR 10 YEARS AND HAS NEVER MISSED A PAYMENT BEFORE.

READ MORE FROM THE KD ARTICLE

I WANT TO WAIVE THE LATE FEE

*— 16*

*— 56*

I'VE HIGHLIGHTED THE MAIN POINTS

KNOWLEDGE DELIVERY

OVERVIEW
THIS DOCUMENT PROVIDES GENERAL INFORMATION ON HOW TO WAIVE LATE CHARGES ON CONSUMER LOAN ACCOUNTS.

WAIVING LATE CHARGES AS A COURTESY MAY NOT ALWAYS BE AN ADEQUATE SOLUTION. BEFORE WAIVING A CHARGE CONSIDER IF THE MEMBER:

- IS NEW AND UNFAMILIAR WITH OUR BILLING PROCESS.
- HAS A FINANCIAL HARDSHIP.
- HAS A GOOD PAY HISTORY.
- IS REQUESTING THE WAIVER FOR THE FIRST TIME.

*FIG. 4*

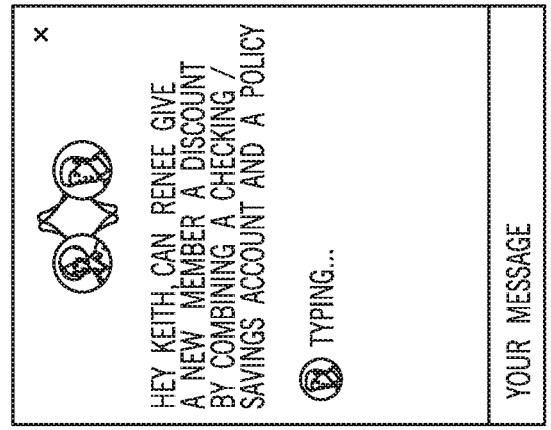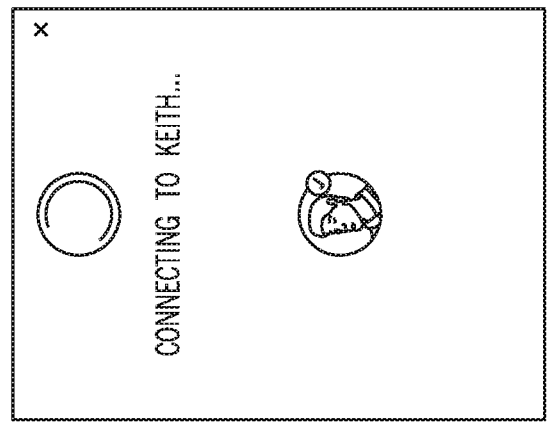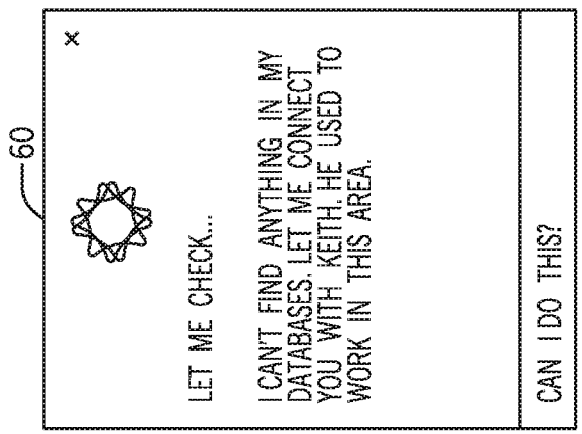
FIG. 7

PREDICTIVE CUSTOMER SERVICE SUPPORT SYSTEM AND METHOD

BACKGROUND

The present disclosure relates generally to customer service support systems and methods, and more specifically to systems and methods that assist customer service representatives (CSRs) based on call-specific data.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Modern businesses may offer CSRs available (e.g., by telephone) to assist a customer with various tasks (e.g., open new accounts, submit complaints, update personal information) or to answer a customer's inquiries (e.g., questions regarding products offered by the business), for example. However, because modern businesses are often diverse (e.g., having several different business operations, products, or services), it may be difficult for the CSRs to properly address the customer's request or inquiry. Furthermore, the CSRs may have to interrupt the call or place the customer on hold to locate a particular application or to find relevant information, which may be inconvenient and time consuming.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system includes one or more processors configured to receive call-specific data during a call between a customer and a customer service representative, and the call-specific data includes a verbal input. The one or more processors are configured to determine one or more characteristics of the verbal input and to determine an initial inquiry of the customer based at least in part on the one or more characteristics of the verbal input. The one or more processors are also configured to determine one or more follow-up inquiries based at least in part on the initial inquiry and to provide information related to the one or more follow-up inquiries in a window on a display of a computing system for visualization by the customer service representative.

In one embodiment, a method includes receiving, at one or more processors, call-specific data during a call between a customer and a customer service representative. The call-specific data comprises a verbal input. The method further includes determining, using the one or more processors, one or more characteristics of the verbal input. Additionally, the method includes determining, using the one or more processors, information to deliver to the customer service representative based at least in part on the one or more characteristics of the verbal input. Moreover, the method involves determining, using the one or more processors, a set of content factors based at least in part the one or more characteristics of the verbal input, the customer, the customer service representative, or a combination thereof. Further, the method involves formatting, using the one or more processors, the information to deliver to the customer service representative based at least in part on the set of content factors and displaying, using the one or more processors, the information in a window on a display of a computing system for visualization by the customer service representative.

In one embodiment, a system includes one or more processors configured to receive call-specific data during a call between a customer and a customer service representative, and the call-specific data comprises a verbal input. The one or more processors are further configured to determine one or more characteristics of the verbal input and to determine information to deliver to the customer service representative based at least in part on the one or more characteristics of the verbal input. Additionally, the one or more processors are configured to determine a set of content factors based at least in part on the one or more characteristics of the verbal input, the customer, the customer service representative, or a combination thereof. Further, the one or more processors are configured to format the information to deliver to the customer service representative based at least in part on the set of content factors. The one or more processors are also configured to display the information in a window on a display of a computing system for visualization by the customer service representative.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein:

FIG. 4 illustrates information that may be provided on the display to assist the CSR in making a decision, in accordance with an embodiment of the present disclosure;

FIG. 7 illustrates information that may be provided on the display to facilitate communication between multiple CSRs, in accordance with an embodiment of the present disclosure;

DETAILED DESCRIPTION

Figure 1:
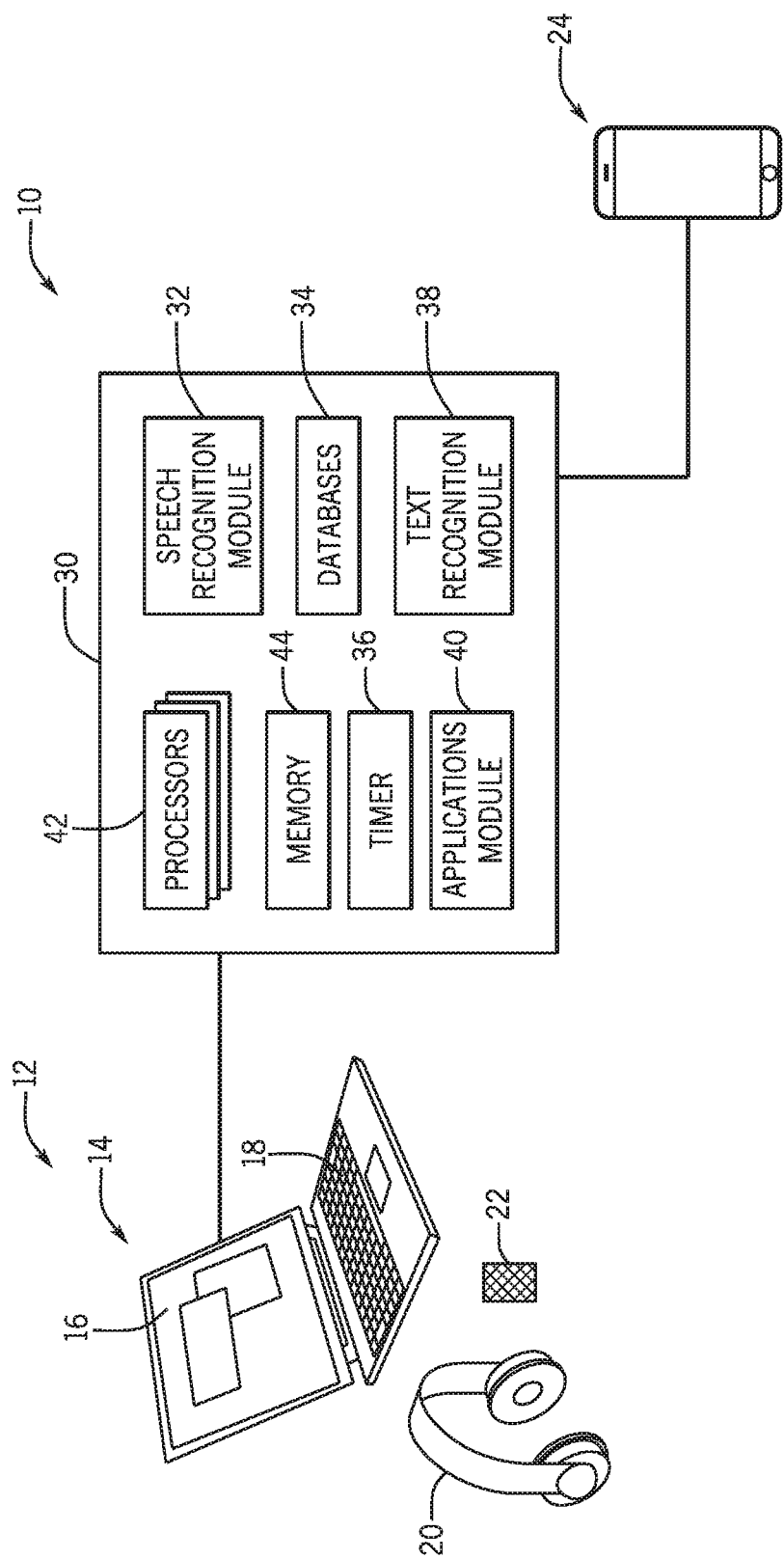
FIG. 1 is a schematic representation of a customer service support system, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Modern businesses often offer a diverse array of services to customers and often consolidate customer service support as a cost-saving measure. Thus, customer service representatives (CSRs) may handle a wide variety of calls and/or other customer communications (e.g., emails, chats, texts, or videos) and may need to quickly access various applications and understand various products. Unfortunately, traditional customer service support systems may be cumbersome to navigate for CSRs.

Accordingly, present embodiments are generally directed toward systems and methods for supporting CSR's. For example, certain embodiments may include a system that is configured to assist CSRs locate appropriate applications, make decisions, obtain accurate and/or relevant information, transfer the customer to another CSR, communicate with another CSR, provide a break after a difficult call or other communication with the customer, or the like. The system may be configured to receive call-specific data, such as customer data, call times, textual inputs, verbal inputs, or the like, and to provide appropriate outputs based on the call-specific data. For example, a customer may call a customer support number and may be routed to a particular CSR, and the system may monitor the customer's speech and/or the CSR's speech during the call. In some embodiments, the system may monitor the call to detect characteristics of the speech (e.g., keywords, phrases, phonemes, sounds, volume, tone, pitch). In response, the system may cause display of pertinent information for visualization by the CSR, such as written instructions that should be completed or an application that should be utilized. Additionally or alternatively, in some embodiments, the system may facilitate training and/or performance tracking for CSRs. Additionally or alternatively, in some embodiments, the system may be configured to determine a difficulty of the call (e.g., based on the call-specific data) and may assign a break to the CSR following a difficult call. Advantageously, the system may enable CSRs to quickly find relevant and accurate information, as well as reduce effort needed to find the information or carry out particular tasks, for example.

Moreover, in some embodiments, the system may be configured to include adaptive and/or predictive functionality. For instance, the system may aggregate data and use a set of models (e.g., functions, algorithms) to determine certain trends, infer (e.g., predict) certain information, and/or the like associated with a particular customer, operation, CSR, or a combination thereof. Accordingly, in some embodiments, the system may use the set of models and/or the aggregated data to automatically perform operations on behalf of the CSR and/or to automatically retrieve information from a variety of sources. Moreover, in some embodiments, the system may provide a conversation guide, which may include information related to one or more predicted follow-up inquiries (e.g., questions) to an initial customer inquiry, to enable a CSR to efficiently and thoroughly address the customer's inquiries. Additionally or alternatively, the system may use the set of models and the aggregated data to adaptively adjust content, including the verbiage, tone, and/or style of information, delivered to the CSR.

FIG. 1 is a schematic representation of an embodiment of a system 10 (e.g., customer service support system) that may be utilized to support one or more CSRs in a call center or in any other environment. In the illustrated embodiment, the system 10 includes a workstation 12 that may be used by the CSR. The workstation 12 may include any of a variety of processing and user interface components, such as a personal computing system 14 having a display 16, an input device 18 (e.g., keypad), a headset 20 (e.g., speaker), and a microphone 22. A customer may use a personal communication device 24 (e.g., mobile phone, telephone, laptop, tablet, computer) to call and to speak with the CSR.

In operation, a call monitoring system 30 may monitor the call between the CSR using the workstation 12 and the customer using the personal communication device 24. For example, the call monitoring system 30 may include a speech recognition module 32 configured to detect characteristics of the customer's speech and/or the CSR's speech (e.g., keywords, phrases, phonemes, sounds, volume, tone, pitch, intensity, rate) during the call. In some embodiments, the speech recognition module 32 may be configured to detect characteristics by comparing various features of the speech to a set of data stored in one or more databases 34. By way of example, the speech recognition module 32 may be configured to detect a keyword by comparing a spoken sound to sets of keywords stored in the one or more databases 34. In this manner, characteristics of the speech can be detected and classified, and then used to determine, retrieve, and/or provide an appropriate output for the CSR.

In addition or as an alternative to speech characteristics or verbal inputs, the call monitoring system 30 may be configured to monitor any of a variety of other call-specific data, such as customer data, call times, textual inputs (e.g., via the input device 18). In some embodiments, the customer data (e.g., age, location, open accounts) may be retrieved from the one or more databases 34, the call times may be determined based on a timer or clock module 36, and the textual inputs may be monitored by a text recognition module 38, such as by comparing textual inputs to a set of data stored in the one or more databases 34. In this manner, the customer data, call times, and textual inputs may be used to determine, retrieve, and/or provide an appropriate output for the CSR.

The appropriate output may be opening an application at the computing system 14 of the workstation 12, providing information for display at the computing system 14 of the workstation 12, providing an indication of an appropriate decision (e.g., waive a late fee, combine accounts), initiating a transfer to another CSR, initiating communication with one or more other CSRs, providing a break to the CSR, or the like. In some embodiments, the call monitoring system 30 may be configured to automatically open an application or initiate an operation using the applications module 40 (e.g., without the CSR clicking on a link, a menu, or icon on the display 16). For example, in response to certain detected keywords related to opening a new account, the applications module 40 may cause an application to open or otherwise display pertinent information on the display 16 of the computing system 14 of the workstation 12 to enable the CSR to open the new account for the customer.

As shown, the call monitoring system 30 includes one or more processors 42 and a memory 44 that enable the call monitoring system 30 to carry out the techniques described herein. The one or more processors 42 may be any suitable type of computer processor or microprocessor capable of executing computer-executable code, and the memory 44 may be any suitable article of manufacture that can serve as media to store processor-executable code, data, or the like. This article of manufacture may represent non-transitory computer-readable media (e.g., any suitable form of memory or storage) that may store the processor-executable code used by the one or more processors 42 to perform the presently disclosed techniques. It should be noted that non-transitory merely indicates that the media is tangible and not a signal.

To facilitate discussion, the call monitoring system 30 is described as being configured to carry out most or all of the processing steps to receive and process call-specific data and to generate appropriate outputs. However, it should be understood that processing functions described herein with respect to the call monitoring system 30 may be carried out by any suitable computing or processing device and/or may be distributed between the one or more processors 42 of the call monitoring system 30, one or more processors of the computing system 14, and/or any other suitable computing or processing device of a computing system (e.g., cloud computing system, servers). For example, in certain embodiments, verbal inputs and/or textual inputs may be received and analyzed at the computing system 14, and then provided to the one or more processors 42 associated with the call monitoring system 30 to facilitate retrieval of appropriate information for presentation to the CSR. Furthermore, the components described above with regard to the call monitoring system 30 are exemplary components and the call monitoring system 30 may include additional or fewer components as shown. Additionally, it should be noted that the call monitoring system 30 may be part of a computing system having multiple computing devices that receive data, process data, and generate outputs to facilitate the disclosed operation of the system 10. With the foregoing in mind, additional details with regard to operation of the system 10 to support the CSR are discussed below.

Figure 2:
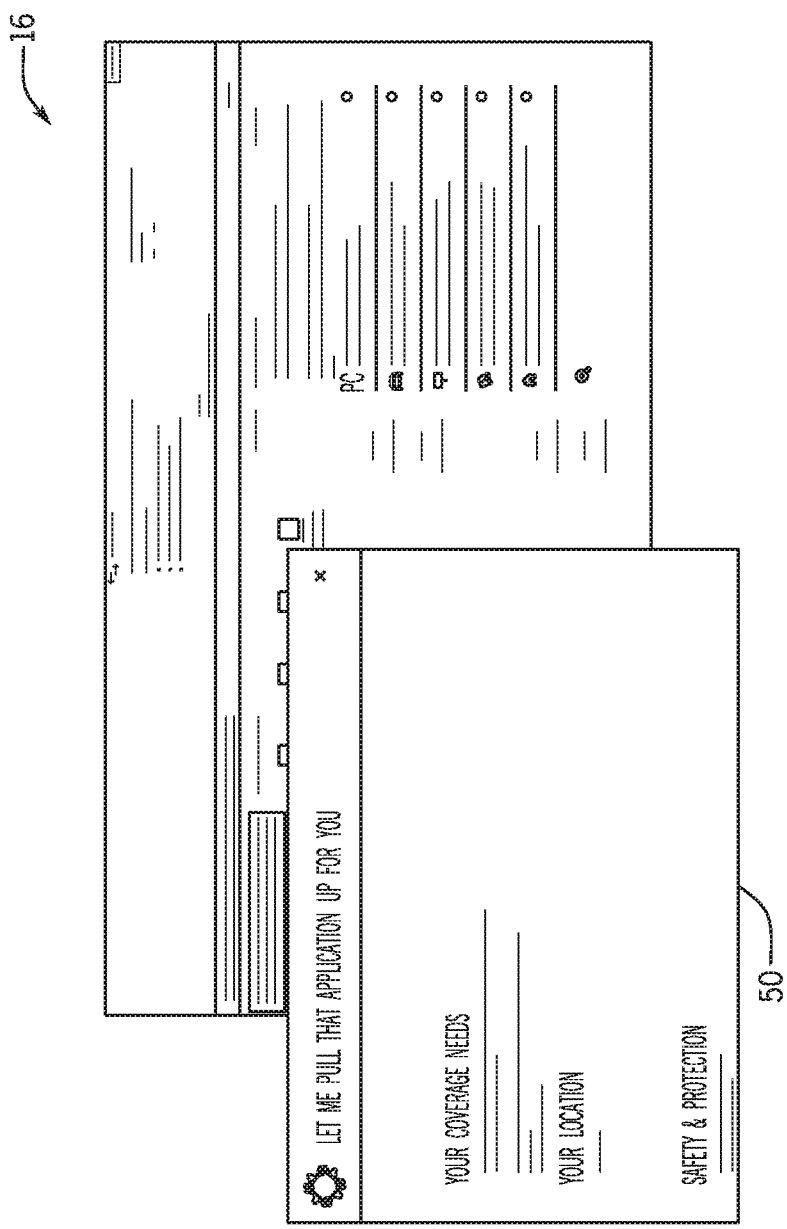
FIG. 2 illustrates information that may be provided on a display to guide a customer service representative (CSR) to an appropriate application related to account changes, in accordance with an embodiment of the present disclosure.

FIG. 2 illustrates information that may be provided on a display, such as the display 16 of the computing system 14 of the workstation 12 shown in FIG. 1. The display 16 may be any suitable type of display, such as a liquid crystal display (LCD), plasma display, or an organic light emitting diode (OLED) display, and may operate to depict indications associated with software or executable code processed by the one or more processors 42.

As discussed above, in operation, the call monitoring system 30 may monitor the call between the CSR and the customer. In response to call-specific data, the call monitoring system 30 may provide various outputs, such as an instruction to open an appropriate application (e.g., in a window 50 on the display 16) to enable the CSR to efficiently and adequately address the customer's inquiry. For example, if the customer states, "I would like to open a new account," the call monitoring system 30 may recognize characteristics of the speech (e.g., recognize keywords using the speech recognition module 32) and may automatically open the appropriate application that the CSR would use to open the new account for the customer, as shown in FIG. 2. To simplify the drawings, FIG. 2 shows several lines that represent text that may be provided on the display.

Figure 3:
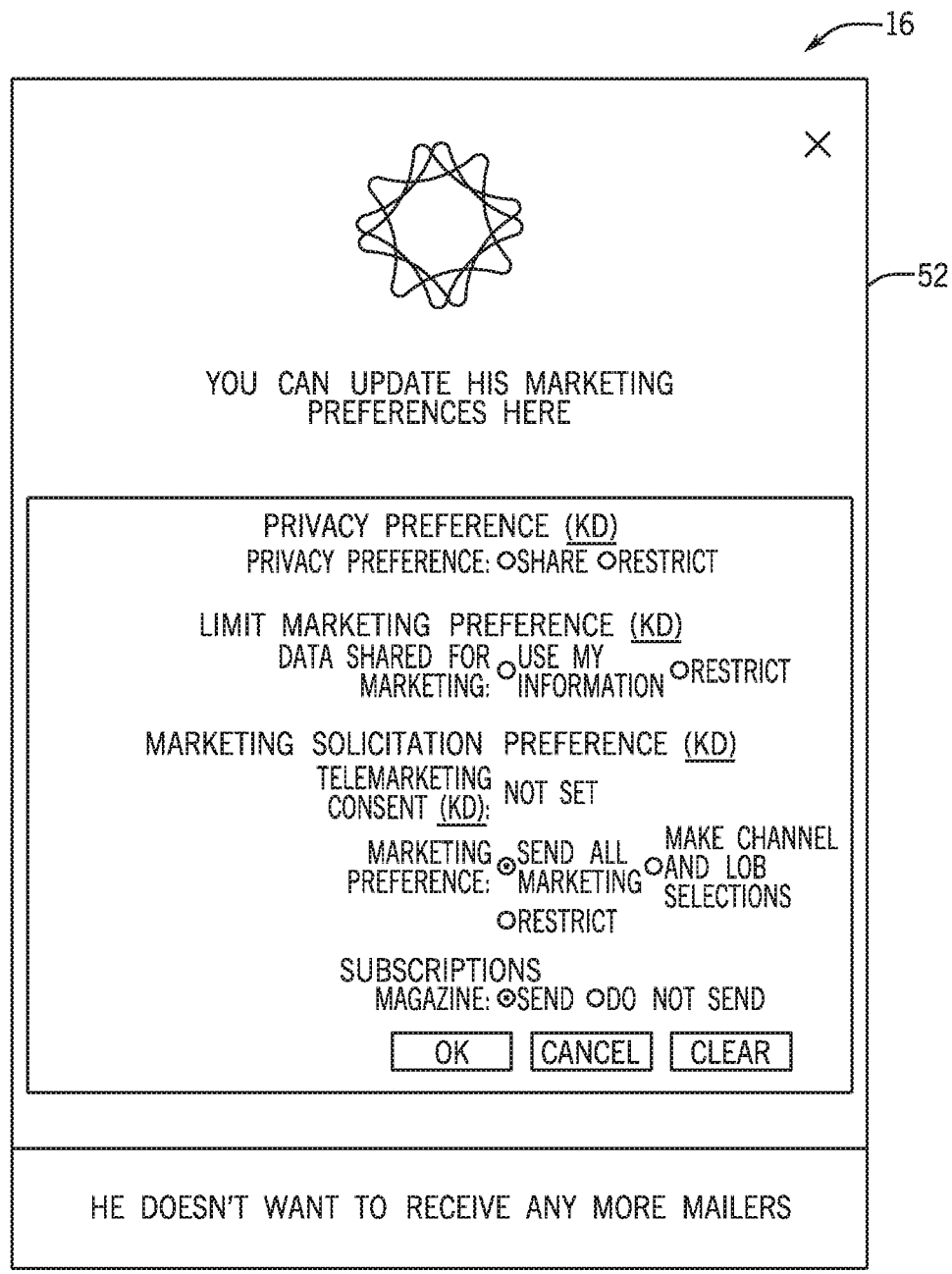
FIG. 3 illustrates information that may be provided on the display to guide the CSR to an appropriate application related to customer preferences, in accordance with an embodiment of the present disclosure.

FIG. 3 illustrates information that may be provided on a display, such as the display 16 of the computing system 14 of the workstation 12 shown in FIG. 1. For example, if the CSR states or types, "he doesn't want to receive any more mailers," the call monitoring system 30 may recognize characteristics of the speech or text (e.g., recognize keywords using the speech recognition module 32 or the text recognition module 38) and may automatically open the appropriate application (e.g., in a window 52 on the display 16) to enable the CSR to efficiently update the customer's preferences regarding mailers. In some embodiments, the call monitoring system 30 may automatically execute the operation (e.g., update the customer's preferences regarding mailers) and may provide an indication to the CSR that the operation is complete. In some such cases, the call monitoring system 30 may automatically execute the operation under certain circumstances, such as if sufficient call-specific data is obtained and indicates a threshold confidence level.

FIG. 4 illustrates information that may be provided on a display, such as the display 16 of the computing system 14 of the workstation 12 shown in FIG. 1, to assist the CSR with a decision or task. For example, if the CSR states or types, "I want to waive the late fee," the call monitoring system 30 may recognize characteristics of the speech or text (e.g., recognize keywords using the speech recognition module 32 or the text recognition module 38) and may automatically provide an indication of an appropriate decision (e.g., in a window 54 on the display 16) and/or relevant information (e.g., in a window 56 on the display 16) to enable the CSR to efficiently address the customer's inquiry.

In some embodiments, the relevant information may include an indication that the subject matter being discussed between the customer and the CSR raises legal issues (e.g., legal or compliance issues). For example, the call monitoring system 30 may recognize characteristics of the speech or text (e.g., recognize keywords using the speech recognition module 32 or the text recognition module 38) and may automatically provide an indication that the topic raises legal issues (e.g., in a window on the display 16) to notify the CSR. In some embodiments, the call monitoring system 30 may provide a recommendation to stop the discussion, transfer the call, or take another action. In some embodiments, the indication may additionally or alternatively be provided to another system, such as a computing system operated by a manager or a compliance officer, for example.

In some embodiments, the call monitoring system 30 may interrupt the call and/or may automatically transfer the call to a more experienced CSR or to a CSR with special training in legal issues. In some embodiments, the relevant information may include an indication that there is an issue with the system, such as certain physical components (e.g., the microphone 22), the network components, or that the database of relevant information is unavailable.

Figure 5:
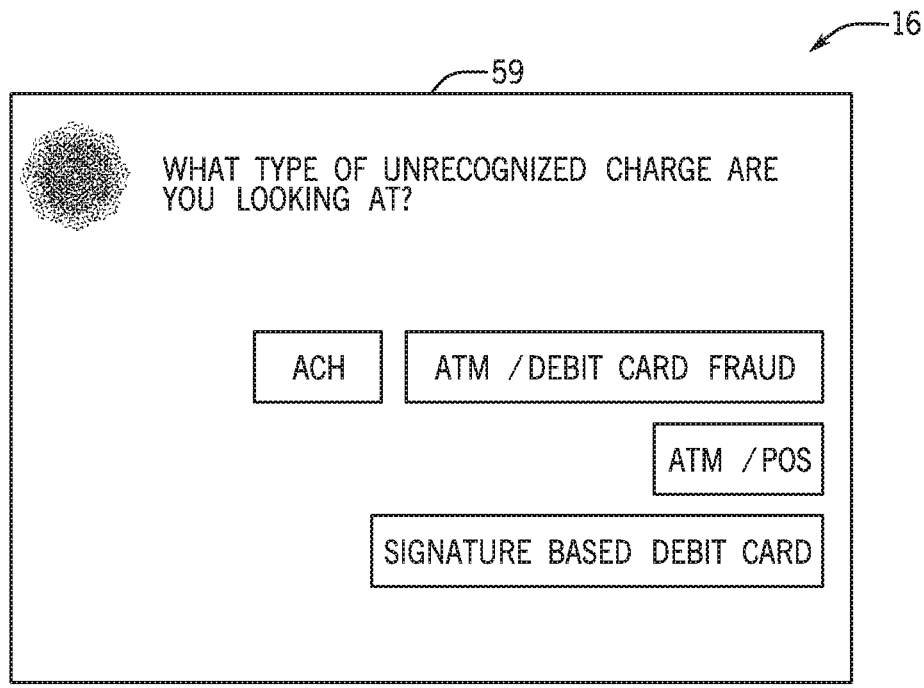
FIG. 5 illustrates word clouds that may be provided on the display to assist the CSR, in accordance with an embodiment of the present disclosure.

FIG. 5 illustrates word clouds that may be provided on a display, such as the display 16 of the computing system 14 of the workstation 12 shown in FIG. 1, to assist the CSR with a decision or task. For example, if the CSR states or types, "unrecognized charge," the call monitoring system 30 may recognize characteristics of the speech or text (e.g., recognize keywords using the speech recognition module 32 or the text recognition module 38) and may automatically provide the word clouds, which enable the CSR to efficiently access relevant information (e.g., in a window 59 on the display 16) with relatively few clicks or other actions.

With reference to FIGS. 2-5, it should be understood that in some embodiments, the call monitoring system 30 may consider multiple inputs together, such as multiple verbal and/or textual inputs from the customer and/or the CSR during the call, customer information retrieved from the one or more databases 34, call time information obtained by the clock module 36 (e.g., timer), or the like, into account to determine the appropriate output. For example, if the customer states that he is between jobs and customer data stored on the one or more databases 34 indicates that the customer has been a member for more than ten years with no missed payments, the call monitoring system 30 may determine that the appropriate output in response to the CSR's query regarding waiver of the fee is to provide an indication that the late fee may be waived, as shown in FIG. 4.

Figure 6:
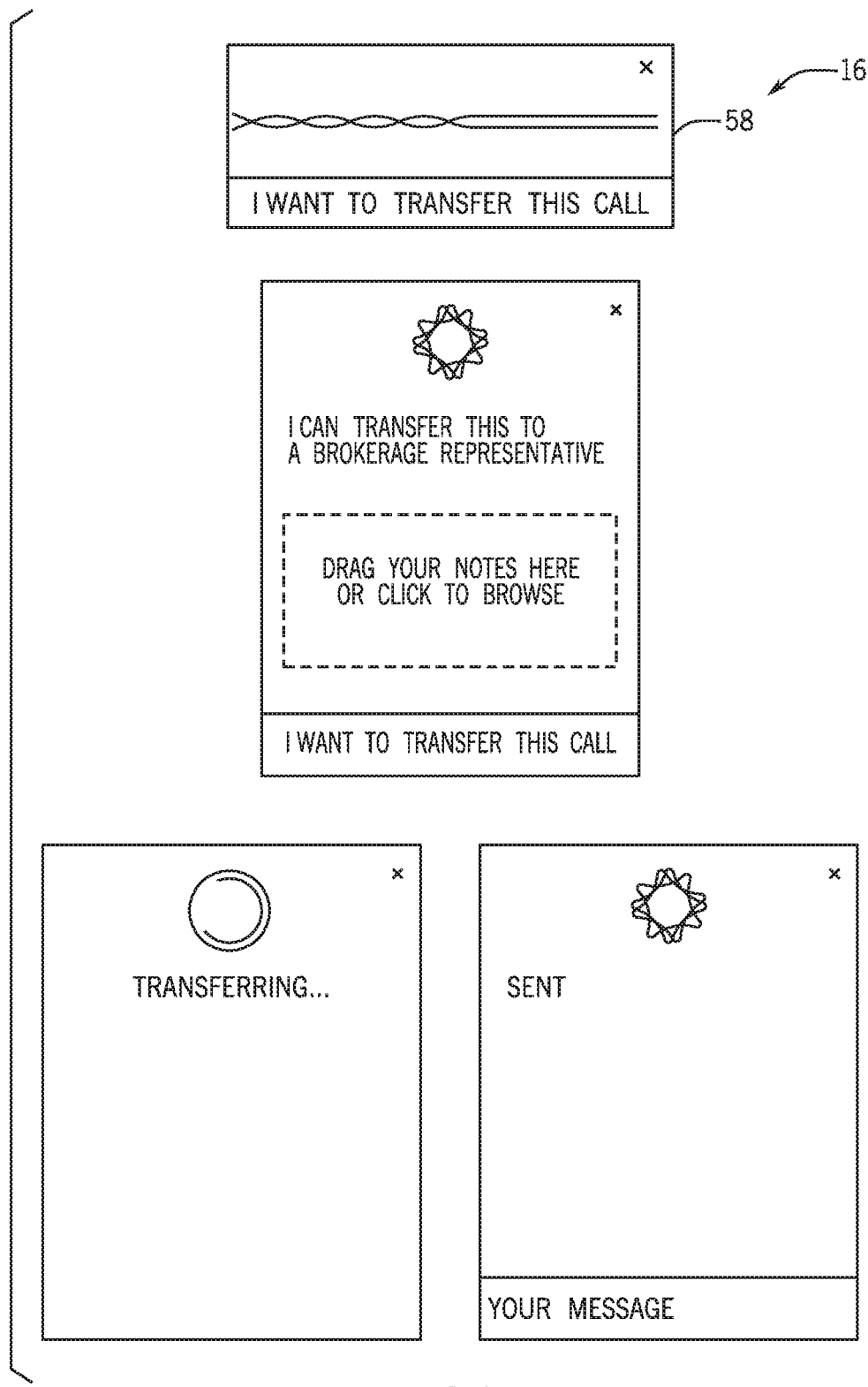
FIG. 6 illustrates information that may be provided on the display to facilitate transfer of the customer to another CSR, in accordance with an embodiment of the present disclosure.

FIG. 6 illustrates information that may be provided on a display, such as the display 16 of the computing system 14 of the workstation 12 shown in FIG. 1, during transfer of the customer to another CSR, in accordance with an embodiment of the present disclosure. As noted above, in some embodiments, the call monitoring system 30 may initiate a transfer of the call to another CSR in response to call-specific data obtained during the call between the customer and the CSR. For example, if the CSR states or types, "I want to transfer this call," the call monitoring system 30 may process the input and/or other inputs (e.g., other verbal and/or textual inputs from the customer and/or the CSR during the call, customer information retrieved from the one or more databases 34, call time information obtained by the clock module 36) to determine an appropriate CSR to assist the customer. For example, if the call monitoring system 30 previously detected keywords or phrases, such as "open account," "checking," or "deposit," during the call, the call monitoring system 30 may determine that the customer should be transferred to another CSR that specializes in banking accounts in response to the CSR's statement requesting a transfer. In some embodiments, the call monitoring system 30 may cause display of a series of windows 58 that show progress of the transfer to the other CSR and/or that facilitate transfer of notes (e.g., notes input by the CSR and/or notes generated by the call monitoring system 30 based the prior exchange between the customer and the CSR) or other information to the other CSR during the transfer.

FIG. 7 illustrates information that may be provided on a display, such as the display 16 of the computing system 14 of the workstation 12 shown in FIG. 1, to facilitate communication between multiple CSRs. As noted above, in some embodiments, the call monitoring system 30 may identify another CSR who may be able to assist the CSR with a particular question and/or may facilitate communication between CSRs in response to call-specific data obtained during the call between the customer and the CSR. For example, if the CSR states or types, "I want to provide a discount. Can I do this?" the call monitoring system 30 may process the input and/or other inputs to determine another CSR who would be able to assist the CSR. Examples of other such inputs ("CSR transition inputs") include other verbal and/or textual inputs from the customer and/or the CSR during the call, customer information retrieved from the one or more databases 34, CSR data retrieved from the one or more databases 34 (e.g., indicative of the CSR's experience), and call time information obtained by the clock module 36. For example, if the call monitoring system 30 previously detected keywords or phrases, such as "new customer," "checking account," during the call, the call monitoring system 30 may determine that another CSR who specializes in opening new banking accounts would be able to assist the CSR and the call monitoring system 30 may open an application that facilitate communication between the CSRs. In some embodiments, the call monitoring system 30 may cause display of a series of windows 60 that show progress of the connection to the other CSR and/or that facilitate exchange of information between the CSRs (e.g., typing via live chat between the CSRs).

Figure 8:
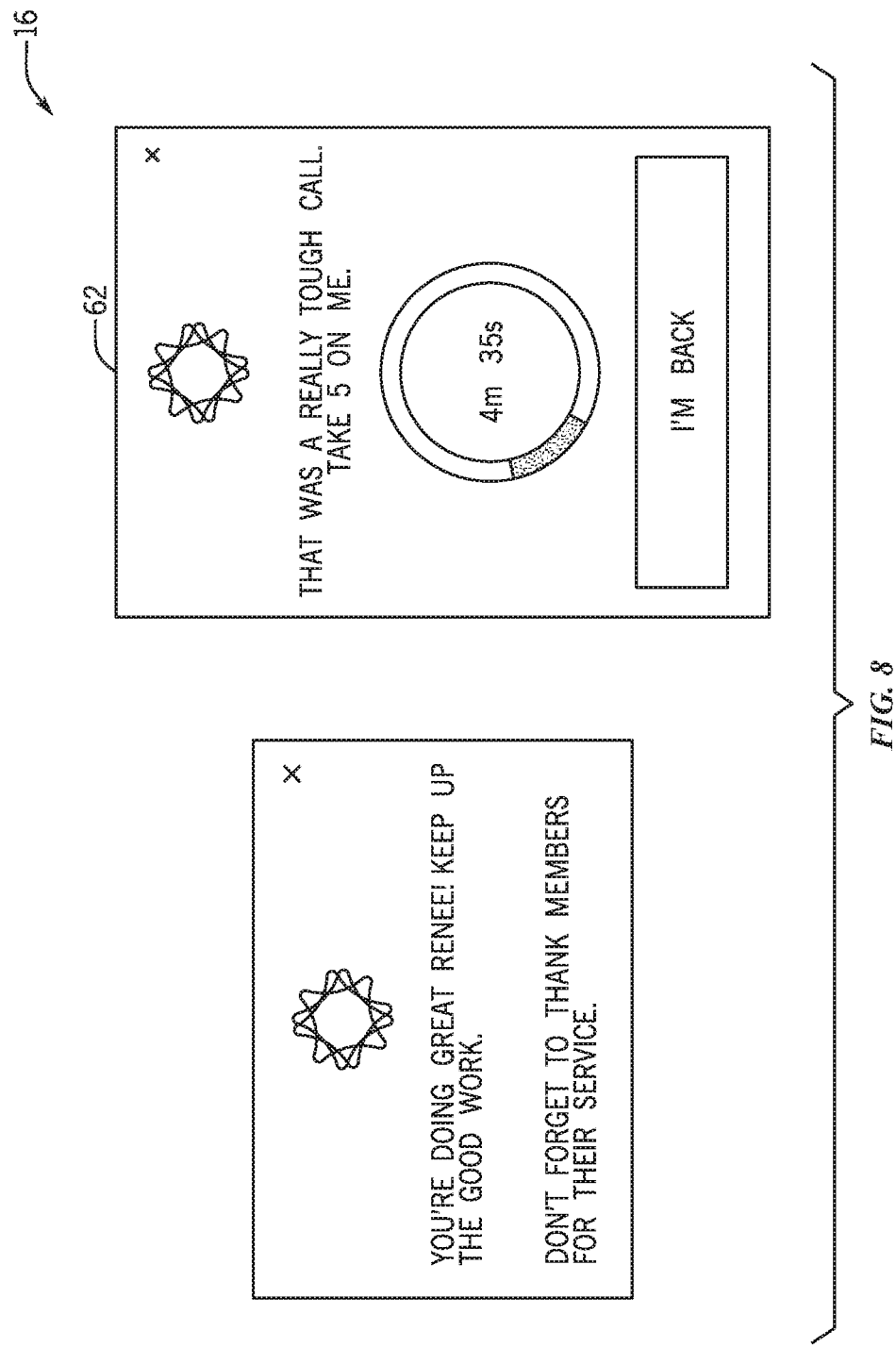
FIG. 8 illustrates information that may be provided on the display while the CSR is on a break from customer calls, in accordance with an embodiment of the present disclosure.

FIG. 8 illustrates information that may be provided on a display, such as the display 16 of the computing system 14 of the workstation 12 shown in FIG. 1, while the CSR is on a break from customer calls. As noted above, in some embodiments, the call monitoring system 30 may determine that a particular call is difficult and may automatically provide a break to the CSR, such as by blocking calls to the workstation 12 for a period of time following the call. In some embodiments, the call monitoring system 30 may provide the break to the CSR by automatically placing the customer on hold or transferring the customer to another CSR (e.g., interrupting the call between the customer and the CSR). The call monitoring system 30 may be configured to determine the difficulty of the call (e.g., difficulty level or rating) based on any of a variety of inputs, such as verbal inputs, textual inputs, customer data, call times, or the like. In particular, in some embodiments, the call monitoring system 30 may monitor one or more characteristics of the customer's speech and/or the CSR's speech to determine the difficulty of the call. For example, the speech-recognition module 32 may analyze and detect certain keywords (e.g., emergency, accident, profanity) and/or a high intensity or volume, which may indicate that the call is difficult. The speech-recognition module 32 may analyze and detect other speech or sound-related factors, such as a high breathing rate or crying sounds, which may also indicate that the call is difficult. The call monitoring system 30 may also analyze or consider a call time or length of the call obtained from the clock module 36, as an unusually long call may also indicate that the call is difficult.

The call monitoring system 30 may receive various other inputs, such as inputs from one or more sensors or biometric monitoring devices configured to measure characteristics (e.g., physiological characteristics) of the customer and/or the CSR. For example, a customer's device (e.g., smart phone or computer) and/or the workstation 12 may include one or more sensors (e.g., cameras or imaging devices) that monitor facial expressions and/or gestures, and signals indicative of such facial expressions and/or gestures may be provided to the call monitoring system 30, as certain expressions (e.g., frowning) and/or gestures (e.g., certain mouth gestures and/or hand gestures) may also indicate that the call is difficult. In some embodiments, a customer's device (e.g., smart watch) and/or the workstation 12 may include one or more sensors that monitor a heart rate or a breathing rate, and signals indicative of the heart rate or breathing rate may be provided to the call monitoring system 30, as increases in heart rate or breathing rate may also indicate that the call is difficult. In some embodiments, the customer may opt-in or connect the customer's device to provide the characteristics of the customer to the call monitoring system 30.

In this way, the call monitoring system 30 may be configured to process the various inputs using one or more algorithms to determine the difficulty of the call, and if the call meets certain criteria (e.g., the difficulty exceeds a particular level), the call monitoring system 30 may initiate or schedule a break for the CSR, such as by blocking calls to the workstation 12. In some embodiments, a length of the break may vary based on the difficulty (e.g., a call with a first difficulty level may result in a break of a first length, while a call with a second, higher difficulty level may result in a break of a second, longer length). In some embodiments, the call monitoring system 30 may cause display of one or more windows 62 that indicate a current or upcoming break and/or that provide various characteristics of the break (e.g., time remaining, total time of the break, reason for the break).

Figure 9:
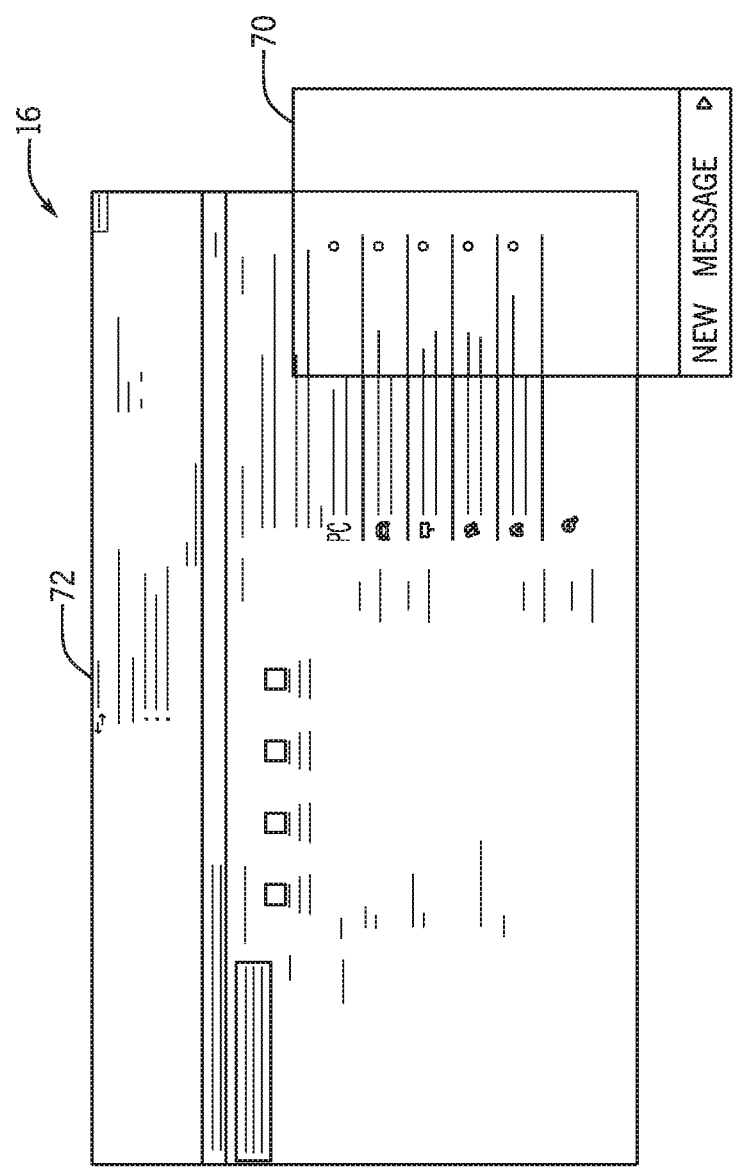
FIG. 9 illustrates a semi-transparent window that enables the CSR to view other windows on the display, in accordance with an embodiment of the present disclosure.

FIG. 9 illustrates the display 16 with a window 70 in a semi-transparent state, which enables the CSR to view information in another window 72 on the display 16. As discussed above with respect to FIGS. 1-7, the call monitoring system 30 may analyze various inputs and provide appropriate outputs, which may include opening an application at the computing system 14 of the workstation 12 and/or providing information for display at the computing system 14 of the workstation 12. In some embodiments, the call monitoring system 30 may cause the window 70 to open in front of the window 72 on the display 16, thereby blocking visualization of at least a portion of the window 72. In some embodiments, the window 70 may be configured to fade to the semi-transparent state and/or to bend, flex, or change position or size to enable the CSR to view information in the window 72 under various conditions. For example, if the CSR clicks on the other window 72, scrolls through the other window 72, hovers a pointer over the other window 72 for more than a first predetermined amount of time, or fails to click within the window 70 within a second predetermined amount of time after the window 70 appears on the display 16, the window 70 may fade to the semi-transparent state or otherwise adjust to enable the CSR to view information in the window 72. Thus, the information in the window 70 may be readily available to the CSR, but does not block the CSR from reviewing the window 72 or completing other tasks in the window 72.

FIGS. 10, 11, 13, and 15 are process flow diagrams illustrating methods of assisting the CSR based on call-specific data, in accordance with aspects of the present disclosure. The methods include various steps represented by blocks. It should be noted that the methods may be performed as an automated procedure by a system, such as the system 10. Although the flow charts illustrate the steps in a certain sequence, it should be understood that the steps may be performed in any suitable order and certain steps may be carried out simultaneously, where appropriate. Further, certain steps or portions of the methods may be omitted and other steps may be added. While certain steps of the methods are discussed with respect to the call monitoring system 30, it should be understood that the steps or portions of the methods may be performed by any suitable processing device and/or by separate devices. For example, a first portion of the method may be performed by the one or more processors 42 of the call monitoring system 30, while a second portion of the method may be performed by a processor of the computing system 14 of the workstation 12.

Figure 10:
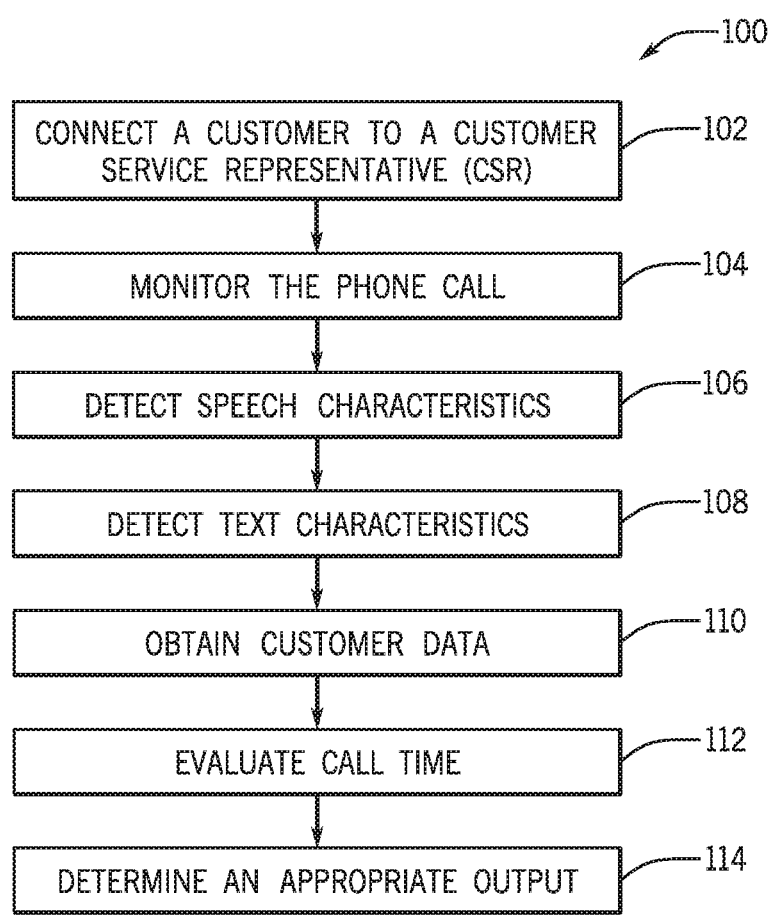
FIG. 10 is a process flow diagram illustrating a method of assisting the CSR based on call-specific data, in accordance with an embodiment of the present disclosure.

With the foregoing in mind, FIG. 10 is a process flow diagram of a method 100 of providing an output to assist the CSR during a phone call with a customer. In block 102, the call monitoring system 30 may facilitate connection between the CSR and the customer. For example, the customer may utilize the personal communication device 24 to call a call center of a business, and the customer's call may be routed to a particular CSR via the workstation 12.

In block 104, the call monitoring system 30 may monitor the phone call. For example, as shown in block 106, the call monitoring system 30 may utilize the speech recognition module 32 to detect characteristics of the customer's speech and/or the CSR's speech (e.g., keywords, phrases, phonemes, sounds, volume, tone, pitch, intensity, rate) during the call. In some embodiments, the speech recognition module 32 may be configured to detect characteristics by comparing various features of the speech to a set of data stored in one or more databases 34. By way of example, the speech recognition module 32 may be configured to detect a keyword by comparing a spoken sound to sets of keywords stored in the one or more databases 34. In this manner, various characteristics of the speech can be detected and classified.

As shown in block 108, the call monitoring system 30 may utilize the text recognition module 38 to monitor textual inputs (e.g., provided by the CSR via the input device 18) or to detect characteristics of text entered by the CSR. In some embodiments, the text recognition module 38 may be configured to detect characteristics by comparing various features of the text to a set of data stored in one or more databases 34, such as by matching keywords. In this manner, various characteristics of the textual input can be detected and classified. As shown in block 110, the call monitoring system 30 may access, retrieve, or obtain customer data (e.g., age, location, open accounts), such as from the one or more databases 34. As shown in block 112, the call monitoring system 30 may obtain the call times from the timer or clock module 36.

In block 114, the call monitoring system 30 may process various inputs, including some or all of the inputs from blocks 104-112, to determine an appropriate output. As discussed above, the appropriate output may include opening an application at the computing system 14 of the workstation 12, providing information for display at the computing system 14 of the workstation 12, providing an indication of an appropriate decision (e.g., waive a late fee, combine accounts), initiating a transfer to another CSR, initiating communication with one or more other CSRs, providing a break to the CSR, or the like.

Figure 11:
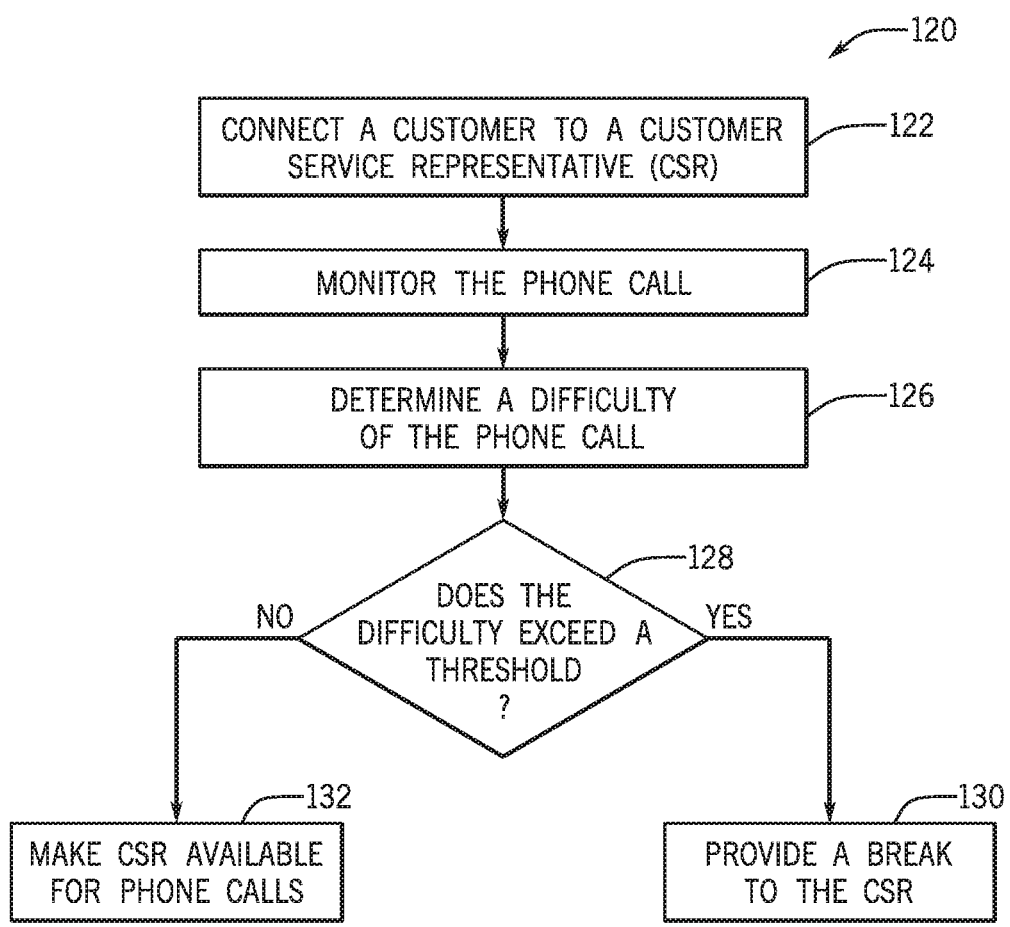
FIG. 11 is a process flow diagram illustrating a method of determining a difficulty of a call and providing a break to a CSR based on the difficulty, in accordance with an embodiment of the present disclosure.

FIG. 11 is a process flow diagram of a method 120 of determining a difficulty of a phone call and providing a break to the CSR following a difficult phone call. In block 122, the call monitoring system 30 may facilitate connection between the CSR and the customer. For example, the customer may utilize the personal communication device 24 to call a call center of a business, and the customer's call may be routed to a particular CSR via the workstation 12.

In block 124, the call monitoring system 30 may monitor the phone call. For example, as discussed in blocks 104-112 in FIG. 10, the call monitoring system 30 may utilize the speech recognition module 32 to detect characteristics of the customer's speech and/or the CSR's speech during the call. In some embodiments, the call monitoring system 30 may utilize the text recognition module 38 to monitor textual inputs. In some embodiments, the call monitoring system 30 may access, retrieve, or obtain customer data and/or the call times (e.g., from the timer or clock module 36).

In block 126, the call monitoring system 30 may determine a difficulty of the phone call (e.g., difficulty level or rating) based on one or more various inputs, such as verbal inputs, textual inputs, customer data, call times, or the like. In some embodiments, the call monitoring system 30 may determine the difficulty based on an analysis of various characteristics of the customer's speech and/or the CSR's speech. For example, certain keywords (e.g., emergency, accident, profanity), as well as a high intensity or volume of the customer's speech and/or the CSR's speech, may indicate that the call is difficult. Other speech or sound-related factors, such as a high breathing rate or crying sounds, may also indicate that the call is difficult. In some embodiments, the call monitoring system 30 may determine the difficulty based on a call time or length of the call, as an unusually long call may also indicate that the call is difficult. Thus, the call monitoring system 30 may be configured to process one or more various inputs using one or more algorithms to determine the difficulty of the call.

In block 128, the call monitoring system 30 may determine whether the difficulty of the phone call exceeds a particular threshold or level. For example, the call may be assigned a difficulty level on an index or scale (e.g., a difficulty level on a scale of 1 to 10), and the call monitoring system 30 may store the threshold (e.g., a difficulty level threshold of 5). If the call is determined to be difficult and/or if the difficulty exceeds the threshold, then the call monitoring system 30 may initiate or schedule a break for the CSR, such as by blocking calls to the workstation 12, in block 130. As noted above, in some embodiments, the call monitoring system 30 may provide the break to the CSR by automatically placing the customer on hold or transferring the customer to another CSR (e.g., interrupting the call between the customer and the CSR). As discussed with respect to FIG. 8, in some embodiments, the call monitoring system 30 may cause display of one or more windows 62 that indicate a current or upcoming break and/or that provide various characteristics of the break (e.g., time remaining, total time of the break, reason for the break, or the like). However, if the call is not determined to be difficult and/or if the difficulty does not exceed the threshold, then the call monitoring system 30 may make the CSR available for phone calls and proceed to connect the CSR to another customer, in block 132.

Further, in some embodiments, the call monitoring system 30 may include adaptive and/or predictive functionality. For instance, the call monitoring system 30 may aggregate data and use a set of models (e.g., functions, algorithms) to determine certain trends, infer (e.g., predict) certain information, and/or the like associated with a particular customer, operation, CSR, or a combination thereof. In some embodiments, the aggregated data may include information related to a particular customer and/or set of customers, data related to a certain operation, data related to a particular CSR, and/or the like. In particular, the call monitoring system 30 may aggregate data, such as account information (e.g., products and/or services included in the account, transaction history), call history (e.g., frequency of calls, call duration, questions asked), and personal history (e.g., occupation status, marital status), among other things, related to the customer. Moreover, the call monitoring system 30 may store information related to a particular operation, such as the frequency with which the operation is performed, a duration associated with performing the operation, and/or the like. Further, the call monitoring system 30 may track call times, customer satisfaction, and/or the like associated with a CSR. The call monitoring system 30 may store (e.g., aggregate) the data, such as the data identified above, in the one or more databases 34. Additionally, the set of models may include a mathematical model, a machine learning (ML) model, a text classifier model (e.g., text classifier), a sentiment analysis model, named entity recognition (NER), a probabilistic model, and/or the like.

Accordingly, in some embodiments, the call monitoring system 30 may use the set of models and/or the aggregated data to automatically perform operations on behalf of the CSR and/or to automatically retrieve information from a variety of sources, as described in greater detail below. Moreover, in some embodiments, the call monitoring system 30 may provide a conversation guide, which may include information related to one or more predicted follow-up inquiries to an initial customer inquiry, to enable a CSR to address the customer's inquiries. Additionally or alternatively, the call monitoring system 30 may use the set of models and the aggregated data to adaptively adjust content, including the verbiage, tone, and/or style of information, delivered to the CSR.

As described above with reference to FIG. 3, the call monitoring system 30 may automatically open an application and/or execute an operation based at least in part on an input (e.g., speech input, textual input, and/or the like) received from the CSR, the customer, or a combination thereof. That is, for example, the call monitoring system 30 may recognize certain characteristics and/or keywords in text or speech and may perform an appropriate action (e.g., opening an application and/or executing an operation) corresponding to the characteristics and/or keywords. More specifically, in some embodiments, the call monitoring system 30 may use a text classifier, named entity recognition model, or a combination thereof, to analyze textual inputs and/or speech inputs. The text classifier may be a function and/or algorithm implemented to receive an input, such as a textual input, and provide an inferred output. In some embodiments, for example, the call monitoring system may use the text classifier to predict (e.g., infer) the topic of a textual input, the intent of the customer, the sentiment of the customer, and/or the like. Further, a named entity recognition model may categorize information included in the input (e.g., textual input and/or speech input) into certain groups, such as names (e.g., identifiers), quantities, products, services, and/or the like.

By way of example, if a customer asks, "what's this non-sufficient fund fee?" the call monitoring system 30 may use the textual classifier and/or the named entity recognition model to determine that the intent of the customer's question is to discover the reason the customer received the fee on their account. The call monitoring system 30 may then determine the information that may address the customer's inquiry, such as the date the fee was added to the account, the account balance at the time the fee was added to the account, pending charges on the account, and/or the like. In some embodiments, the call monitoring system may determine the information related to the customer's inquiry based on information stored in the one or more databases 34, such as the aggregated data described above, and/or the set of models, such as a mathematical model and/or a machine learning model. For instance, in some embodiments, the mathematical model may map a particular input to a particular output, and the machine learning model, such as a support vector machine and/or an artificial neural network, may infer an output based on the particular input and a history of previous input/output combinations and their respective outcomes. Accordingly, if a direct mapping between a keyword identified in the customer's inquiry and an operation exists, the mathematical model may determine the operation corresponding to the keyword. For example, after identifying the keyword "non-sufficient fund fee," the call monitoring system 30 may use the mathematical model to determine that the customer's account balance is relevant to addressing the customer's inquiry based on a mapping between the non-sufficient fund fee and the account balance. On the other hand, if a mapping between the keyword "non-sufficient fund fee" and certain information does not exist, the call monitoring system 30 may use the machine learning model to predict an operation and/or information that may be related to the keyword based on other keywords, an indirect mapping between information, aggregated data, and/or the like. Accordingly, the call monitoring system 30 may predict whether information is relevant to the customer based on aggregated data from a variety of sources.

As an additional example, if a customer states, "I want a new credit card," the call monitoring system 30 may use the textual classifier and/or the named entity recognition model to determine that a new credit card account may be opened. Further, in some embodiments, the call monitoring system 30 may automatically perform the operations involved with establishing a new credit card account. For example, the call monitoring system 30 may automatically retrieve information associated with the customer and/or a new credit card account. Further, the call monitoring system 30 may use the textual classifier and/or the named entity recognition model to populate fields associated with the new credit card account (e.g., a name, address, and/or other data associated with the account owner), with corresponding information associated with the customer. That is, for example, the textual classifier and/or names entity recognition model may extract categorized and/or uncategorized data associated with the customer from the speech and/or textual inputs, the one or more databases 34, and/or the like, and may auto-populate a form and/or field associated with the new credit card account that corresponds to the extracted data. Further, after performing an operation and/or a set of related operations, such as opening a credit card account and verifying the customer's information associated with the account, among other operations, the call monitoring system 30 may provide a confirmation to the CSR that the operation and/or set of related operations have been performed. Accordingly, the call monitoring system 30 may also enable the CSR to review, modify, or cancel the operations (e.g., review or modify the completed form; approve or cancel submission of the completed form) performed automatically by the call monitoring system 30.

Additionally, in some embodiments, the call monitoring system 30 may identify types of information that are missing, which may prevent the automatic and/or manual (e.g., via the CSR) completion of an operation. For instance, the call monitoring system 30 may determine that an identifier (e.g., account number, member number), address, marital status, and/or the like associated with the customer is not stored in the one or more databases 34. In such embodiments, the call monitoring system 30 may prompt the CSR to collect the missing information from the customer. Additionally or alternatively, the call monitoring system 30 may determine that the information may be accessed from an external system, such as a public database accessible via the Internet, an additional system (not shown) included in the system 10 (e.g., a system dedicated to another service), and/or the like, and may retrieve the information from the external source.

Figure 12:
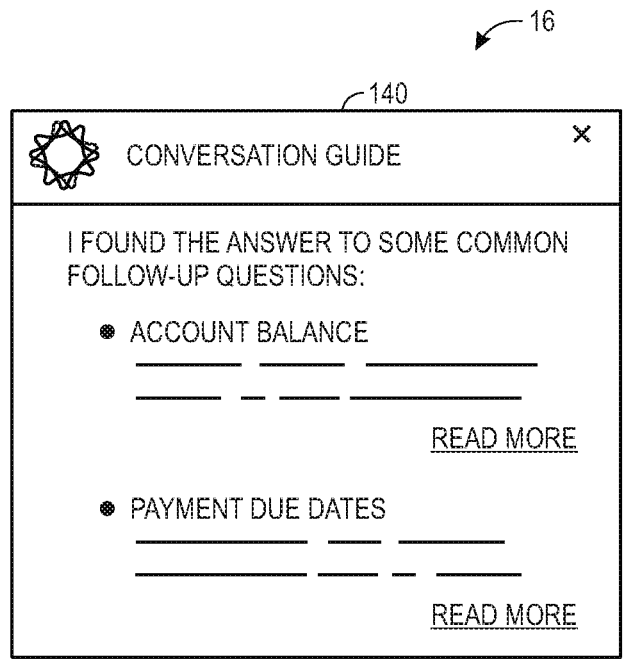
FIG. 12 illustrates information that may be provided on a display to assist the CSR in answering and/or anticipating follow-up inquiries to the customer's initial inquiry, in accordance with an embodiment of the present disclosure.

Turning now to FIG. 12, in some embodiments, the call monitoring system 30 may monitor the call between the CSR and the customer to determine and/or predict the flow of the conversation (e.g., to predict future conversation topics). For instance, if the CSR states or types, "I want to waive the late fee," the call monitoring system 30 may automatically provide the window 54 and/or the window 64 on the display 16 to enable the CSR to efficiently address the customer's inquiry, as discussed with reference to FIG. 4. Moreover, the call monitoring system 30 may provide a conversation guide (e.g., in a window 140 on the display 16). For instance, the call monitoring system 30 may determine a set of additional inquiries the customer is likely to make after the initial inquiry and may output information related to this set of additional inquiries to the CSR. Accordingly, after addressing the initial customer inquiry (e.g., after waiving the late fee), the CSR may be prepared to efficiently answer follow-up inquiries from the customer and/or may offer to provide to the customer other relevant information, such as an updated account balance, due dates for additional fees, options to set up automatic payments, and/or the like.

In some embodiments, the call monitoring system 30 may infer the set of additional inquires (e.g., the follow-up inquiries) based at least in part on aggregated information related to the customer, the customer's initial inquiry, the operation associated with the customer's inquiry, and/or the like. For example, the call monitoring system 30 may determine information associated with the customer's account and a history associated with the initial inquiry (e.g., past calls related to the initial inquiry), among other things. Moreover, the call monitoring system 30 may use a set of models, such as a probabilistic model, to generate predictive probabilities associated with potential follow-up inquiries based at least in part on the determined information. For instance, the call monitoring system 30 may use logistic regression, an artificial neural network, a support vector machine, a Bayesian model, or a combination thereof, to determine the predictive probabilities, and the call monitoring system 30 may present the follow-up inquiries having the highest predictive probabilities to the CSR (e.g., in the window 140 on the display 16). Accordingly, if the call monitoring system 30 determines that past calls including the customer's initial inquiry, which may be initiated by the customer or another customer, commonly included a first follow-up inquiry, the call monitoring system 30 may present information related to the first follow-up inquiry to the CSR. However, if the call monitoring system 30 identifies the first follow-up inquiry is identified as being relevant to a certain subset of customers (e.g., customers having certain characteristics, such as customers with a particular account, a certain marital status, age group) that excludes the customer, the call monitoring system 30 may omit information associated with the first follow-up inquiry from the window 140 on the display 16. Further, if the call history of the customer indicates that a second follow-up inquiry is included in the customer's calls, regardless of the initial inquiry, the call monitoring system 30 may prompt the CSR with information related to the second follow-up inquiry. That is, for example, the call monitoring system 30 may use information specific to the customer and/or associated with a set of customers to predict information related to the set of follow-up inquiries that is relevant to the customer. While the call monitoring system 30 is described herein as using certain parameters, such as data associated with the customer, a set of customers, the initial inquiry, and/or the like, to determine the set of additional inquires, the embodiments described herein are intended to be illustrative and not limiting.

Further, in some embodiments, the customer's initial inquiry may be broad and/or may have multiple applicable answers. For example, if the customer states, "I would like to open a new account," the call monitoring system 30 may recognize that the new account may refer to a checking account, a savings account, or a credit card, and that within these account types, the customer may be provided with a set of options and customizability. For instance, each of the account types may have the option of being set up as a joint account with another authorized user. Additionally or alternatively, the accounts may have a variety of tiers, which may correspond to benefit options (e.g., overdraft forgiveness, complimentary checks, waived transaction fees) and/or an account size (e.g., total balance, initial deposit sums). Accordingly, the call monitoring system 30 may provide the CSR with a conversation guide that may include questions and/or information predicted to most rapidly and/or relevantly address the customer's initial inquiry. For example, as described above, in response to the customer's inquiry regarding a new account, the call monitoring system 30 may determine a set of follow-up inquiries and/or information related to the set of follow-up inquiries to present to the CSR (e.g., in the window 140 on the display 16) based at least in part on aggregated information related to the customer, the operation of opening a new account, and/or the like. Because the call monitoring system 30 may retrieve and provide the information related to the set of follow-up inquiries in response to the customer's initial inquiry, the CSR may have the answer to the customer's additional inquiries readily available. Accordingly, the latency involved with the CSR locating the answer to a customer's follow-up inquiry may be reduced. As a result, the CSR may more rapidly address the customer's inquiries, which may increase the efficiency of the call center.

Figure 13:
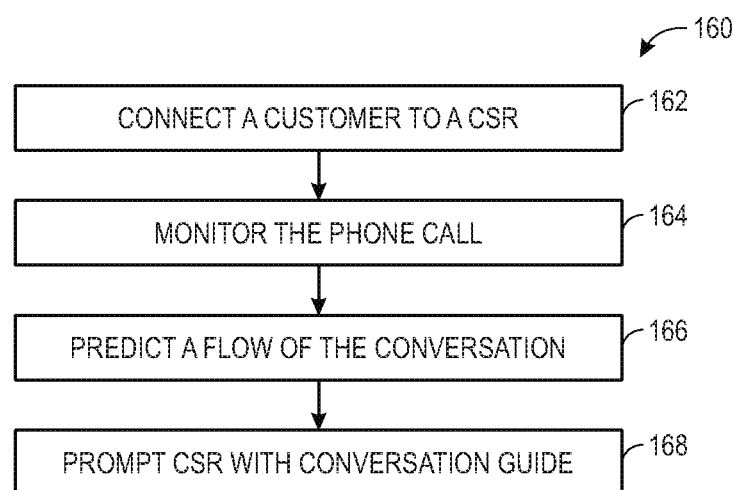
FIG. 13 is a process flow diagram illustrating a method of providing information related to a predicted follow-up inquiry to the CSR based on the customer's initial inquiry, in accordance with an embodiment of the present disclosure.

With the foregoing in mind, FIG. 13 is a process flow diagram of a method 160 of providing a conversation guide, which may include information related to follow-up inquiries predicted to be associated with and/or to follow an initial inquiry, to assist the CSR during a conversation with a customer. In block 162, the call monitoring system 30 may facilitate connection between the CSR and the customer. For example, the customer may utilize the personal communication device 24 to call a call center of a business, and the customer's call may be routed to a particular CSR via the workstation 12.

In block 164, the call monitoring system 30 may monitor the phone call. For example, as discussed in blocks 104-112 in FIG. 10, the call monitoring system 30 may utilize the speech recognition module 32 to detect characteristics of the customer's speech and/or the CSR's speech during the call. In some embodiments, the call monitoring system 30 may utilize the text recognition module 38 to monitor textual inputs. In some embodiments, the call monitoring system 30 may access, retrieve, or obtain customer data and/or the call times (e.g., from the timer or clock module 36).

Further, in block 166, the call monitoring system 30 may predict a flow (e.g., direction and/or intent) of the conversation based on one or more inputs, such as verbal inputs, textual inputs, customer data, call times, or the like, as well as a set of models. For example, the call monitoring system 30 may determine that a customer has made an inquiry and/or that a CSR has requested to perform an operation for a customer based on an analysis of the customer's speech, the CSR's speech, and/or the CSR's interaction with the call monitoring system 30 (e.g., via the input device 18). The call monitoring system 30 may then predict a set of follow-up inquiries related to the customer's inquiry and/or the operation performed by the CSR, as discussed above. That is, for example, the call monitoring system 30 may use the inquiry and/or operation, aggregated information associated with the customer, the CSR, the operation, the inquiry, and/or the like, as well as the set of models, to infer a set of follow-up inquiries that may be asked by and/or are relevant to the customer. In some embodiments, the call monitoring system 30 may associate certain predictive probabilities corresponding to how likely it is that the customer will make a particular inquiry. Moreover, for a set of potential inquiries, the call monitoring system 30 may rank the inquiries based on the associated predictive probabilities. In such embodiments, the call monitoring system 30 may select a number (e.g., 2, 5, 10) of the highest ranked inquiries and may present information corresponding to each of the highest ranked inquiries to the CSR. Additionally or alternatively, the call monitoring system 30 may identify the inquiries with a predictive probability greater than a threshold probability (e.g., 20, 30, 50, 70, or more percent) and may present information related to (e.g., answers corresponding to) the inquiries with the predictive probability greater than the threshold to the CSR.

The call monitoring system 30 may prompt the CSR with a conversation guide, which may include the predicted conversation flow (e.g., information associated with predicted follow-up inquiries), in block 168. More specifically, as discussed with respect to FIG. 12, the call monitoring system 30 may cause the presentation of one or more windows 140 on the display 16. Accordingly, the call monitoring system 30 may provide information related to the predicted flow of the conversation to the CSR, which may enable the CSR to address the customer's inquiries more efficiently.

Figure 14:
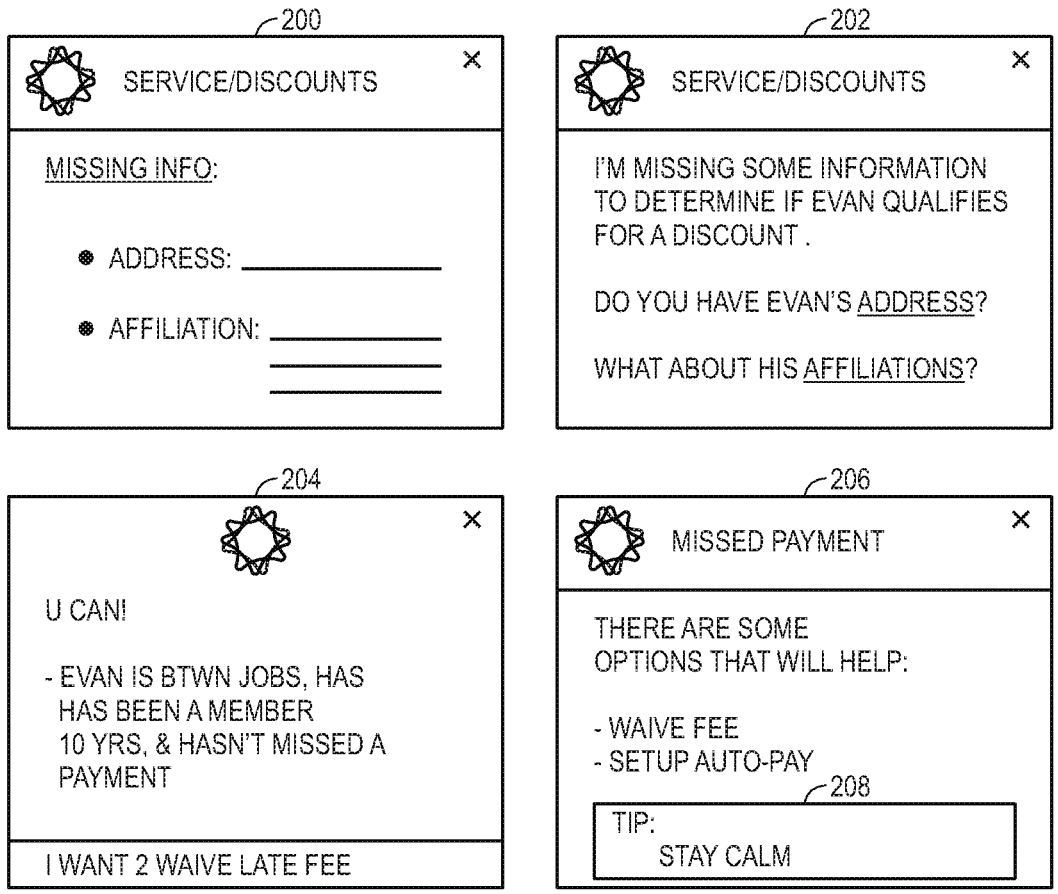
FIG. 14 illustrates information that may be provided on a display to the CSR that is adapted based at least in part on a set of content factors, in accordance with an embodiment of the present disclosure.

Turning now to FIG. 14, the call monitoring system 30 may dynamically adapt the content delivered to the CSR. In particular, the call monitoring system 30 may adjust the verbiage, tone (e.g., sentiment), format, and/or the like of information provided to the CSR based on a set of factors. The set of factors may include, for example, the volume of calls received at the call center, customer and/or CSR sentiments, customer and/or CSR preferences, call histories, and/or the like. For instance, if the call monitoring system 30 determines that the volume of calls received at the call center is high (e.g., based on a threshold number of calls, current wait time, the availability of the CSRs), the call monitoring system 30 may provide succinct messages (e.g., abbreviated text, a list, brief statements) in the content delivered to the CSR. On the other hand, if the volume of calls received at the call centers is low, the call monitoring system 30 may provide more verbose messages (e.g., complete sentences, background information, follow-up inquiries) in the content delivered to the CSR. For example, as illustrated in FIG. 14, if the volume of calls received at the call center is high, the call monitoring system 30 may cause a window 200 with direct prompts (e.g., a bulleted list) to the CSR. As such, the CSR may efficiently digest the content and may address the customer's inquiry rapidly. Accordingly, the CSR may handle a greater number of calls in a certain time period. In contrast, the content illustrated in the window 202 contains longer messages (e.g., complete sentences). In some embodiments, the longer messages may contain additional information relevant to the customer and/or operation, such as additional products and/or services the customer may be interested in and/or more specific instructions for the CSR to perform an operation (e.g., step-by-step instructions), among other things. Accordingly, the call monitoring system 30 may cause the window 202 to be presented to address the same inquiry as addressed in the window 200 when the call volume of the call center is low.

Additionally or alternatively, the call monitoring system 30 may identify appropriate content to present to a CSR based in part on the experience level and/or certain preferences associated with the CSR. That is, for example, the call monitoring system 30 may present the window 200 to a CSR that is familiar with a particular operation, such as identifying discounts available to a customer, while the call monitoring system 30 may present the window 202 to a CSR that is new to and/or unfamiliar with the particular operation. Moreover, the CSR may provide input and/or feedback to the call monitoring system 30 regarding the format and style of the presented content. Accordingly, in some embodiments, the call monitoring system 30 may use the input and/or feedback to determine the preferences related to content associated with the CSR (e.g., to determine whether to present window 200 or window 202 based on the preferences).

In some embodiments, the call monitoring system 30 may determine the preferences associated with the CSR based in part on aggregated data, which may include the input and/or feedback described above. Additionally or alternatively, the call monitoring system may use a set of models, such as a mathematical model, a machine learning model, and/or the like to infer the preferences associated with the CSR. For example, the call monitoring system 30 may determine that a CSR that has performed a first operation, such as setting up a new checking account, a certain number of times (e.g., 5, 10, 15, 20, or more) may successfully interact with succinct content (e.g., a bulleted list) to perform the first operation in the future. That is, for example, the CSR may successfully fulfill a customer's inquiry using the succinct content. Moreover, the call monitoring system 30 may predict that the CSR may successfully interact with the same type of content (e.g., succinct content) to perform a second operation, such as setting up a new savings account. For instance, based on the set of models, performance data related to the second operation, preference information associated with a set of CSRs that have performed the second operation, and/or the like, the call monitoring system 30 may predict appropriate content (e.g., succinct content) to present to the CSR such that the CSR may successfully perform the second operation even if the CSR is unfamiliar with (e.g., has not performed) the second operation.

Further, the call monitoring system 30 may adjust the style of the content delivered to the CSR based in part on the style of the content (e.g., inputs) produced by the CSR. For example, referring back to FIG. 4, if the CSR states or types, "I want to waive the late fee," the call monitoring system 30 may cause the window 54 to be displayed with the illustrated message, which includes complete sentences and unabbreviated terms. Turning back to FIG. 14, if the CSR states or types, "waive late fee," or types, "I want 2 waive late fee," the call monitoring system 30 may match and/or mimic the style (e.g., abbreviated, slang) of the CSR. Accordingly, the call monitoring system 30 may cause the window 206 to be displayed. As illustrated, the information presented in window 206 may convey the same meaning as the information presented in window 54. However, the content in window 206 includes shortened text, abbreviations, and/or symbols in place of full words (e.g., "btwn" in place of "between," "yrs" in place of "years," "&" in place of "and").

Additionally, the call monitoring system 30 may adjust the vocabulary included in the content delivered to the CSR. For example, the call monitoring system 30 may deliver content that uses more complex vocabulary to a CSR that uses a complex vocabulary, while the call monitoring system 30 may use a simpler vocabulary in the content delivered to a CSR that uses a simpler vocabulary. Additionally or alternatively, the call monitoring system 30 may adjust the vocabulary in the content to match the vocabulary level of the customer such that the CSR may provide information to the customer in an understandable and familiar context. In some embodiments, the call monitoring system 30 may adjust the vocabulary included in the content delivered to the CSR based on whether the customer uses a more complex vocabulary or a simpler vocabulary, so that the CSR is prompted or led to convey information to the customer using vocabulary that is understandable and familiar to the customer.

Moreover, the call monitoring system 30 may adjust the content delivered to the CSR based in part on sentiment analysis corresponding to the customer, the CSR, the operation to be performed, and/or the like. As discussed above, the call monitoring system 30 may use the speech recognition module to detect speech characteristics, such as keywords, phrases, sounds, volume, tone, pitch, intensity, rate, and/or the like, during the call. Along with the speech characteristics, the call monitoring system 30 may use a set of models, such as a sentiment analysis model, a text classifier, a machine learning model, and/or the like, to determine the customer's sentiment (e.g., mood and/or emotions) and/or the CSR's sentiment. Moreover, after determining the customer's sentiment, the call monitoring system 30 may adapt the content delivered to the CSR to match and/or mitigate the customer's emotions. For example, when the customer is excited, the call monitoring system 30 may adapt the content delivered to the CSR such that the CSR is encouraged or led to share the customer's enthusiasm. Further, when the customer is upset (e.g., angry, worried, nervous), the call monitoring system 30 may adapt the content delivered to the CSR such that the CSR can improve the customer's negative feelings. For example, the call monitoring system 30 may provide content that encourages or leads the CSR to be calm, positive, patient, and/or the like.

By way of example, FIG. 14 includes a window 206 that includes content that may be delivered to a CSR to address a customer's missed payment based at least in part on the customer's sentiment. More specifically, the window 206 includes content that may be delivered to a CSR when a customer is upset due to a missed payment. In some embodiments, for example, the call monitoring system 30 may detect (e.g., via the speech recognition module 32) that the customer's tone is angry based on an elevated volume and/or intensity of the customer's voice (e.g., shouting, telling) and/or the terms used by the customer (e.g., "frustrating," "irritated"). To improve the customer's attitude (e.g., sentiment), which may enable the CSR to more efficiently address the customer's inquiry or concern (e.g., the missed payment), the call monitoring system 30 may adapt the content delivered to the CSR to include information related to the customer's sentiment in addition to information useful to addressing the customer's inquiry. Accordingly, as illustrated in the window 206, the call monitoring system 30 may provide a reminder 208 to the CSR to adjust the CSR's sentiment and/or present the information in a way that, if repeated by the CSR, may improve the customer's attitude (e.g., "there are some options that will help," which may calm the customer). As further illustrated, the call monitoring system 30 may provide the CSR information regarding the customer's detected sentiment, such that the CSR is made aware of the customer's sentiment. For example, the call monitoring system 30 may provide a message indicating that the customer appears to be (e.g., is detected to be) upset, excited, worried, confused, and/or the like.

Figure 15:
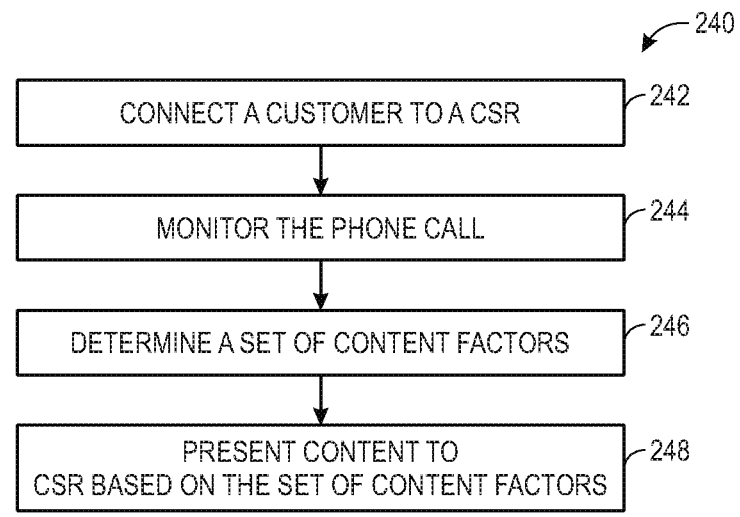
FIG. 15 is a process flow diagram illustrating a method of adapting content presented to the CSR during an interaction with the customer, in accordance with an embodiment of the present disclosure.

With the foregoing in mind, FIG. 15 is a process flow diagram of a method 240 of adapting content presented (e.g., via the display 16) to the CSR during an interaction (e.g., a call, email, chat, video, or the like) with a customer. In block 242, the call monitoring system 30 may facilitate connection between the CSR and the customer. For example, the customer may utilize the personal communication device 24 to call a call center of a business, and the customer's call may be routed to a particular CSR via the workstation 12.

In block 244, the call monitoring system 30 may monitor the phone call. For example, as discussed in blocks 104-112 in FIG. 10, the call monitoring system 30 may utilize the speech recognition module 32 to detect characteristics of the customer's speech and/or the CSR's speech during the call. In some embodiments, the call monitoring system 30 may utilize the text recognition module 38 to monitor textual inputs. In some embodiments, the call monitoring system 30 may access, retrieve, or obtain customer data and/or the call times (e.g., from the timer or clock module 36).

Further, in block 246, the call monitoring system 30 may predict and/or determine a set of content factors associated with the customer, the customer's inquiry, the CSR, and/or the like. The set of content factors may include, for example, the volume of calls received at the call center, customer and/or CSR sentiments, customer and/or CSR preferences, call histories, and/or the like. Accordingly, the call monitoring system 30 may predict (e.g., infer) and/or determine the set of content factors based at least in part on the detected characteristics of the customer's and/or CSR's speech, identified textual inputs, retrieved customer data, call times, and/or the like. More specifically, in some embodiments, the call monitoring system 30 may determine the customer's sentiment using the detected characteristics of the customer's speech (e.g., detected by the speech recognition module 32) and a set of models, such as a sentiment analysis model. Moreover, in some embodiments, the call monitoring system 30 may determine the CSR's preferences, such as content formatting and/or style preferences, based in part on feedback from the CSR, information related to other CSRs, performance history associated with the CSR, and/or the like. That is, for example, the call monitoring system 30 may use information from a variety of sources and the set of models to determine and/or infer the CSR's preferences, as described above with reference to the windows 200, 202, and 204. The call monitoring system 30 may additionally or alternatively determine the set of content factors based in part on other information, such as customer feedback and/or call durations. Moreover, the examples described herein are intended to be illustrative and not limiting.

In block 248, the call monitoring system 30 may cause the presentation of content (e.g., via one or more windows, such as window 200, window 202, window 204, window 206) determined based in part on the set of content factors on the display 16. That is, for example, while a wide variety of content formatting and/or styles may be applied to information to be delivered to the CSR, the call monitoring system 30 may present the content based in part on the determined set of content factors. Accordingly, the presented content may be adapted and/or customized for a particular customer, CSR, operation, and/or the like. To that end, as described with reference to FIG. 14, the call monitoring system 30 may present content adapted with a particular format (e.g., succinct or verbose messages), with a particular text style (e.g., abbreviated and/or slang or formal), toward a particular customer sentiment (e.g., to match or mitigate the sentiment), and/or the like. As a result, the CSR may successfully and/or efficiently perform an operation and/or address a customer's inquiry using the customized (e.g., adapted) content.

It should be appreciated that the techniques disclosed herein could be adapted to support a CSR during text messaging, emails, chat, video chat, and/or other types of customer support operations. In such cases, any suitable communication-specific data, such as customer data, call times, textual inputs, verbal inputs, images, and/or video may be utilized by the call monitoring system 30. For example, during a video chat, the image may be processed to monitor the customer's and/or the CSR's facial expressions and/or gestures (e.g., smiling gestures or hand gestures) to determine the difficulty of the customer communication. For example, upon opening an email from a customer inquiring about closing an account, the call monitoring system 30 may automatically open an appropriate application at the computing system 14 of the workstation 12 that enables the CSR to close the customer's account. Moreover, after receiving a text message from a customer inquiring about an account balance, the call monitoring system 30 may prompt the CSR with a sample text message response to the customer, which may include the requested account balance, as well as additional account details (e.g., pending payments) that are predicted to be relevant to the customer. Further, the call monitoring system 30 may format the sample text message response to match (e.g., mimic) the format and/or style of the customer's text message. For example, the call monitoring system 30 may provide a sample text message response with emoticons and abbreviated text to match the format and/or style of the customer's text message. It should also be appreciated that the call monitoring system 30 may facilitate training and/or performance assessment for the CSR. For example, the call monitoring system 30 may be configured to replicate or reproduce (e.g., store and replay) customer calls for training and to aid in CSR evaluation. For example, if the CSR asks a question, the call monitoring system 30 may utilize the speech recognition module 32 to process the question and then may provide relevant information for display on the display 16. Furthermore, the call monitoring system 30 may track and output an indication of a number of transferred calls, a number of questions asked, types of questions asked (e.g., pertaining to certain areas or topics), call times, or the like, and such information may be utilized to assess the CSR's understanding of certain topics, efficiency, independence, or the like.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:
1. A method, comprising:
    receiving, at one or more processors, call-specific data during a call between a customer and a customer service representative, wherein the call-specific data comprises a verbal input;

determining, using the one or more processors, one or more-keywords of the verbal input;

determining, using the one or more processors, information to deliver to the customer service representative based at least in part on the one or more keywords of the verbal input;

determining, using the one or more processors, a set of content factors based at least in part the one or more keywords of the verbal input, customer data accessed from one or more databases, and a volume of calls received by a call center associated with the customer service representative;

formatting, using the one or more processors, the information to deliver to the customer service representative based at least in part on the set of content factors and to contain more words in response to the volume of calls being low;

formatting, using the one or more processors, the information to deliver to the customer service representative based at least in part on the set of content factors and to contain less words in response to the volume of calls being high; and displaying, using the one or more processors, the information in a window on a display of a computing system for visualization by the customer service representative.

2. The method of claim 1, wherein determining the set of content factors comprises determining a respective sentiment of the customer, a respective sentiment of the customer service representative, or a combination thereof.

3. The method of claim 2, comprising formatting, using the one or more processors, the information to deliver to the customer service representative to match the respective sentiment of the customer.

4. The method of claim 2, comprising formatting, using the one or more processors, the information to deliver to the customer service representative to mitigate the respective sentiment of the customer.

5. The method of claim 1, comprising formatting, using the one or more processors, a vocabulary, a style, a tone, or a combination thereof, of the information to deliver to the customer service representative based at least in part on the set of content factors.

6. The method of claim 1, comprising determining, using the one or more processors, the set of content factors based at least in part on a mathematical model, a machine learning model, a text classifier model, a sentiment analysis model, a named entity recognition model, a probabilistic model, or a combination thereof.

7. The method of claim 1, wherein determining, using the one or more processors, the information to deliver to the customer service representative comprises:

determining, using the one or more processors, an operation associated with the one or more keywords of the verbal input;

identifying, using the one or more processors, a data field associated with the operation;

determining, using the one or more processors, data corresponding to the data field is unavailable; and generating, using the one or more processors, a prompt for the customer service representative to retrieve the data corresponding to the data field, wherein the information to deliver to the customer service representative comprises the prompt.

8. A system, comprising:

one or more processors configured to:

receive call-specific data during a call between a customer and a customer service representative, wherein the call-specific data comprises a verbal input;

determine one or more characteristics of the verbal input;

determine information to deliver to the customer service representative based at least in part on the one or more characteristics of the verbal input;

determine a set of content factors based at least in part on a volume of calls received by a call center associated with the customer service representative and the one or more characteristics of the verbal input, the customer, the customer service representative, or a combination thereof;

format the information to deliver to the customer service representative to contain more words while the volume of calls is low;

format the information to deliver to the customer service representative to contain less words while the volume of calls is high; and display the information in a window on a display of a computing system for visualization by the customer service representative.

* * * * *